MAGNETIC INFORMATION STORAGE

Original Filed April 2, 1962 3 Sheets-Sheet 1

INVENTOR.
JOSEPH W. GRATIAN
BY T. L. Styner
ATTORNEY

MAGNETIC INFORMATION STORAGE

Original Filed April 2, 1962 3 Sheets-Sheet 2

MAGNETIC INFORMATION STORAGE

Original Filed April 2, 1962 3 Sheets-Sheet 3

United States Patent Office 3,492,667

Patented Jan. 27, 1970

3,492,667

MAGNETIC INFORMATION STORAGE

Joseph W. Gratian, Monroe County, N.Y., assignor to General Dynamics Corporation, a corporation of Delaware Continuation of applications Ser. No. 184,426, Apr. 2, 1962, and Ser. No. 533,770, Mar. 4, 1966. This application Jan. 29, 1968, Ser. No. 701,479

Int. Cl. G11b 5/00

U.S. Cl. 340—174 27 Claims

ABSTRACT OF THE DISCLOSURE

Ferroacoustic memory devices and systems utilizing such devices are described. The device includes a line of retentive magnetizable magnetostrictive material, a transducer for propagating acoustic pulses so that they travel axially along the line and have substantially no torsional components, and means for applying signals either in analog or digital form such that they generate magnetic fields in a transverse or circumferential direction. The system addresses the line such that it may be magnetized in incremental areas selected along the line. Readout is accomplished non-destructively by propagating an acoustic signal along the line.

This invention relates to information storage and is particularly directed to methods and means for nonperishable magnetic storage of signals. This application is a continuation of my copending applications, Ser. No. 533,770 filed Mar. 4, 1966 and Ser. No. 184,426, filed by applicant on Apr. 2, 1962, now abandoned.

The need for inexpensive storage of information, in terms of cost per unit of information, continues to be a pressing problem. The cost of digital computers or inventory systems, for example, is a function not only of bulk capacity but of accessibility of all parts of the stored information. Rapid access, reliable retrieval, stability, nonperishability and erasability are desired characteristics of most storage systems.

An object of this invention is to provide improved methods and means for magnetic storage of information.

A more specific object of this invention is to provide magnetic storage having low cost, reliability, rapid and random access to all parts of the stored material as well as erasability and non-perishability of the stored information.

The objects of this invention are achieved by propagating an acoustic stress wave along an elongated body, or line, such as a rod, ribbon, tube, or wire. The material of the body is of the type which changes electromagnetically under stress, this property preferably being evidenced by a measurable change in magnetic permeability. The stress wave traveling through the body is, accordingly, accompanied by a wave or traveling area or spot having a distinct permeability or reluctance. At a particular point in its travel, measurable in time, the position of the stress wave may be marked or recorded by a magnetic field of sufficient strength to permanently magnetize the particular local area which has been made susceptible by the stress wave. Thereafter, the localized magnetized area may be employed to induce an electric pulse in a conductor by propagating a second acoustic stress wave through the area. The location or address of the recorded bit of information becomes a function of the time interval between the instant of the start of stress wave propagation and the induced electric pulse. The properties of the storage line include, first, relatively high magnetostrictive sensitivity, second, good electrical conductivity, and, third, relatively high magnetic retentivity.

These three properties may be incorporated, by suitable manufacture, in a single body or in separate strata from which the body may be fabricated. Hereinafter the body of these properties will be called a "line."

Other objects and features of this invention will become apparent to those skilled in the art by referring to the specific embodiments of the invention described in the following specification and shown in the accompanying drawings, in which.

Figure 2:
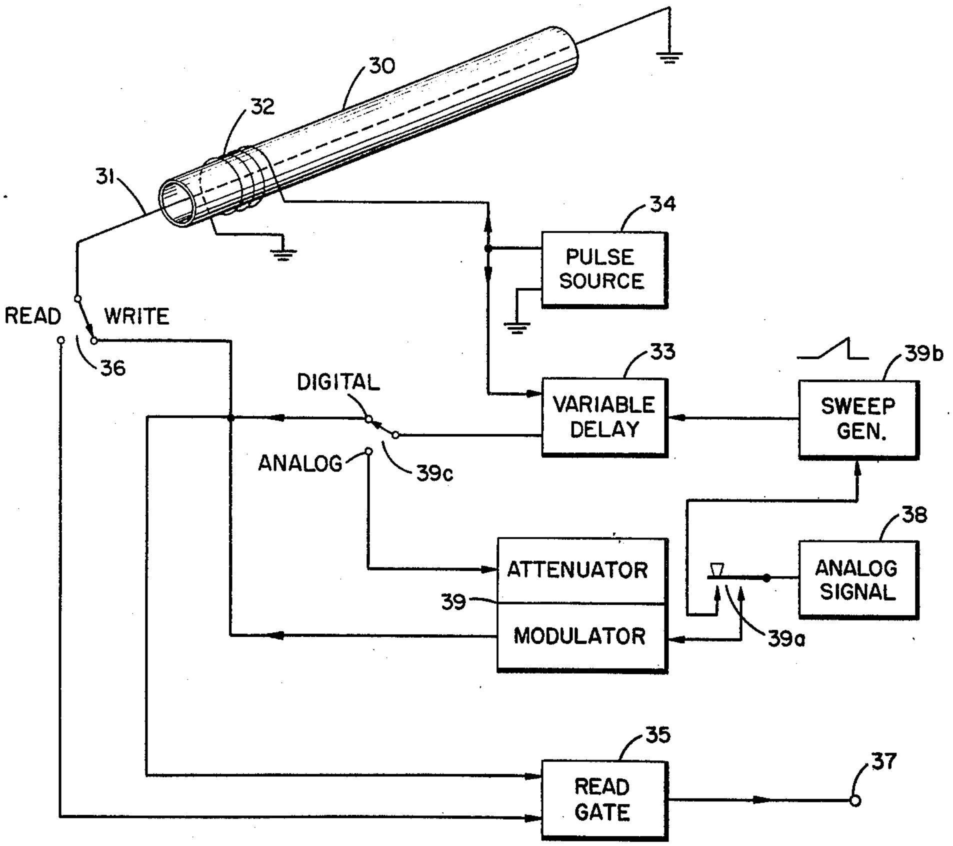
FIG. 2 shows partially in block form and partially in perspective form a system embodying the invention which includes one magnetic storage line and read-in and read-out circuitry.
Figure 2A:
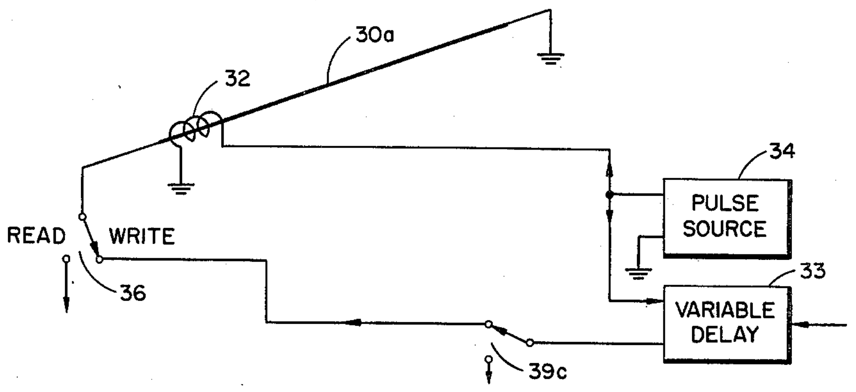
Figure 3:
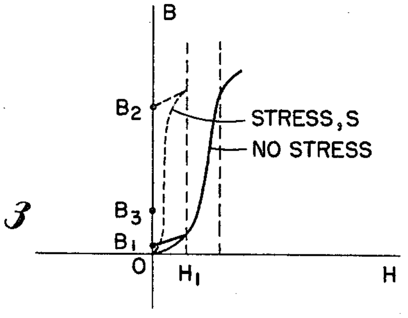
Figures 4, 4A:
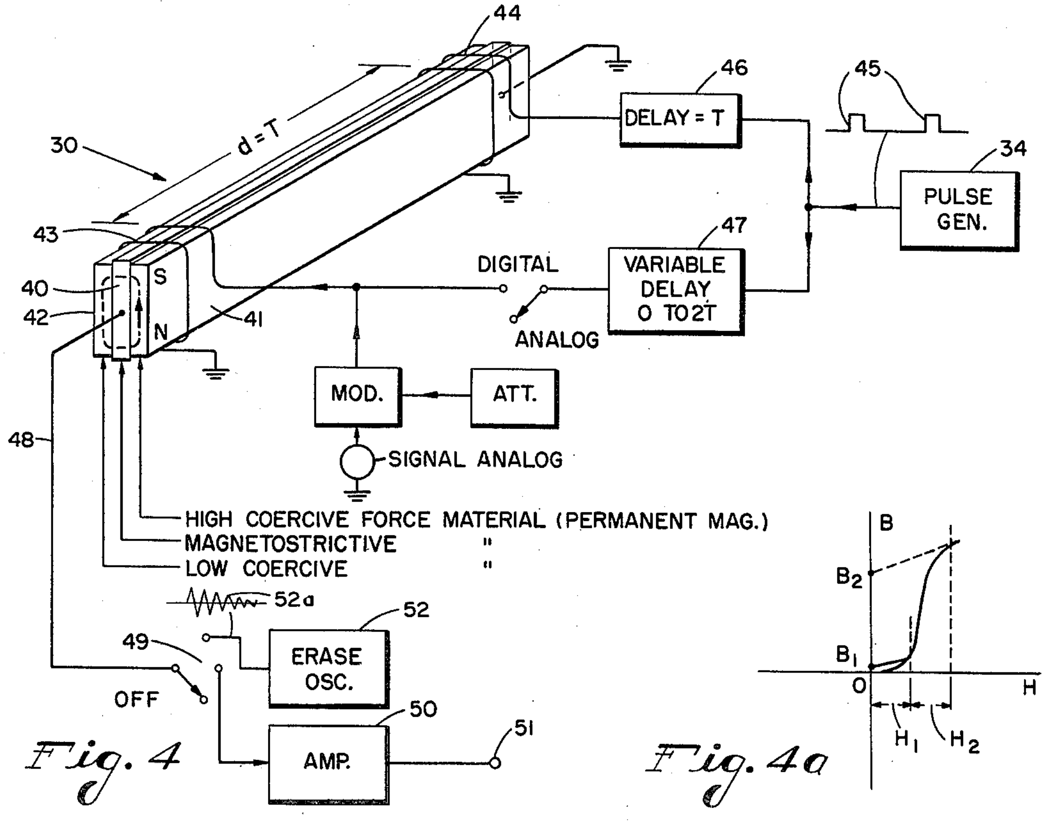
Figure 5:
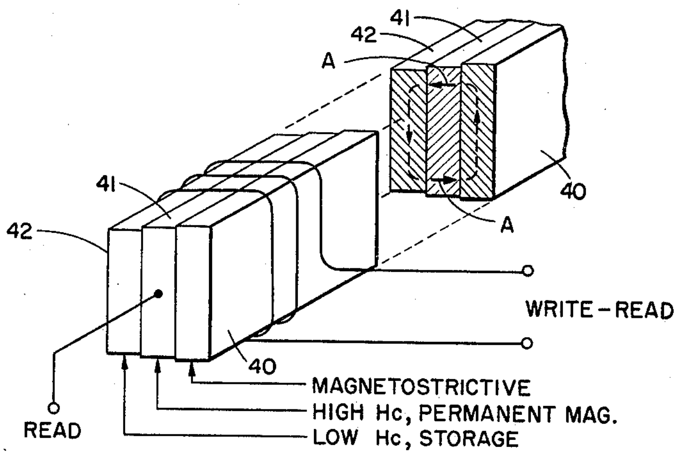
Figure 6:
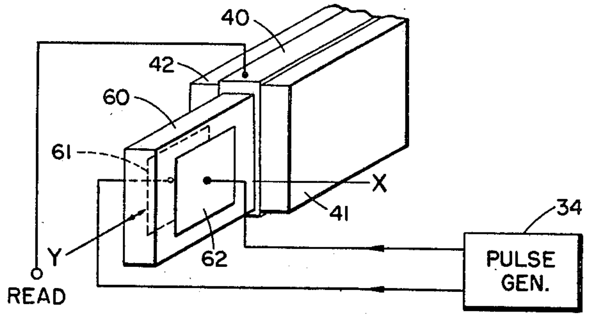
Figure 7:
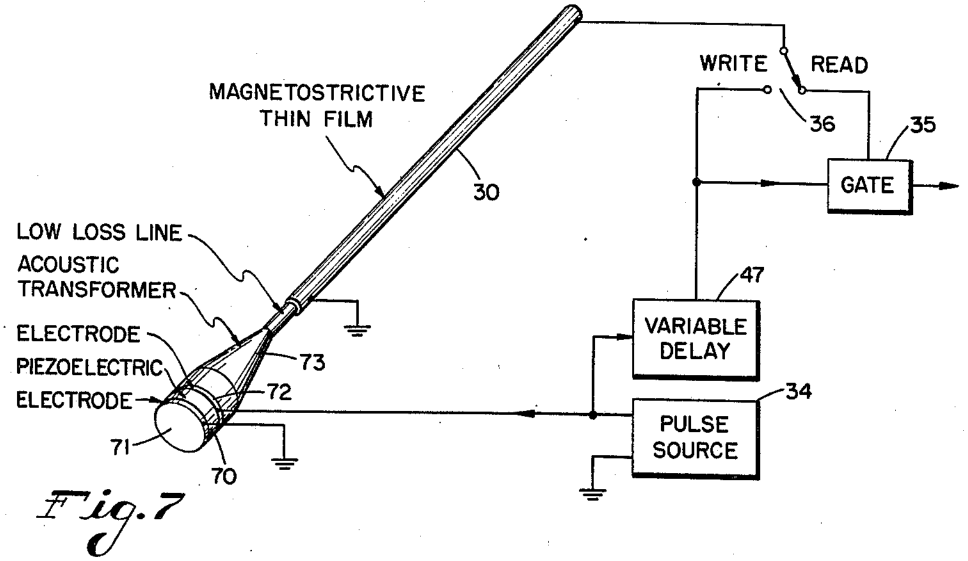

FIG. 2*a* shows another embodiment of the invention shown in FIG. 2;

FIG. 3 shows an enlarged detail of the particular portion of a magnetostrictive characteristic employed in the device of this invention;

FIG. 4 is a perspective view of another magnetic storage line with read-in and read-out circuitry embodying this invention;

FIG. 4*a* shows the B–H characteristic of the storage line of FIG. 4;

FIG. 5 shows a fragmentary perspective view of an alternative arrangement of laminae of a storage line of this invention;

FIG. 6 is a perspective view of an alternative transducer embodying this invention; and FIG. 7 shows in perspective a storage line comprising a piezoelectric core.

Figure 1:
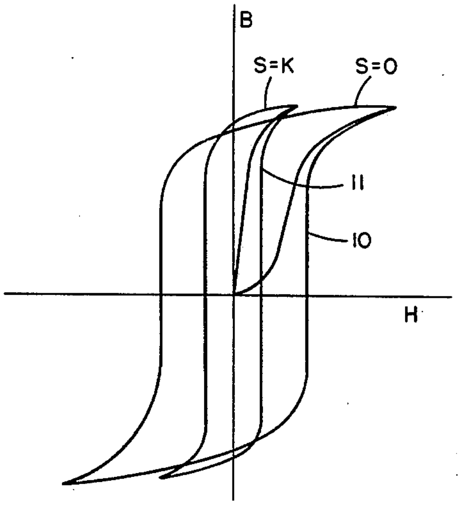
FIG. 1 is a B–H characteristic curve for a certain magnetostrictive material.

One of the aspects of this invention comprises the propagation of an acoustical wave through a solid body. The velocity of propagation of an acoustical wave through many metals, suitable for this invention, is of the order of 500,000 centimeters per second. A second important aspect of this invention comprises "magnetostriction" which implies that property of ferromagnetic material which results in a change of dimensions of the material when the material is placed in a magnetic field. Magnetostriction also implies the inverse effect in which permeability or magnetic induction changes when the dimensions of the metal are changed by an external force. When certain ferromagnetic metals are stressed, the magnetic permeability, $\mu$, changes, and the change may be either in a positive or a negative direction. Commercially pure nickel, for example, will decrease in permeability when placed under tension, within the stress range of importance here. Certain commercial alloys of nickel, cobalt, and iron are also sensitive to stress and will increase in permeability under tension. It is contemplated, in this invention, that an acoustic wave be propagated through a ferromagnetic magnetostrictive material and that the area of stress be accompanied by a distinct change in magnetic permeability. The wave may be referred to as a magneto-acoustic wave. The relationship of stress to permeability of one magnetostrictive line is illustrated in FIG. 1 where the B–H curve for a magnetostrictive material such as 60% NiFe is shown. The area of the hysteresis loop 10 of the material unstressed is relatively large, and considerable electromotive force H is required to magnetically saturate the metal, the necessary reverse field being relatively high as expected to return the induction B of the metal to zero. When, however, the material is placed under tension and the stress, S, is of a finite value, K, the area of the loop 11 is dramatically reduced. It is important to note that the force H, either positive or negative, to obtain saturation is relatively small.

In the embodiment of this invention shown in FIG. 2, the storage line consists of a tube 30. The tube 30 is of magnetostrictive material having the hysteresis properties illustrated in FIG. 1, and having measurable magnetic retentivity. At or near one end of the tube 30 is placed a transducer 32 for shocking the tube to start and propagate a stress wave along the tube. The area of stress is characterized by a momentary change in permeability and, hence, is capable of being locally magnetized. Now, when a magnetic field of sufficient strength is applied to that area, the area is permanently magnetized. To this end, the electrical conductor 31 is disposed so that the circumferential magnetic field caused by current in the conductor links the tube. The stress-producing transducer is, in FIG. 2, the coil 32 which is placed coaxially about the left end of the line 30 and is connected to the pulse source or generator 34. When a pulse of current is applied to the coil, the tube is locally stressed and an acoustic wave is propagated from left to right along the tube. Both ends of the tube are preferably mounted in supports which will absorb the acoustic wave and will prevent reflections. The pulses from generator 34 are also applied to electrical conductor 31. The pulses to the conductor are first delayed in a variable or adjustable delay device 33. Such a delay device may comprise, for example, a one-shot multivibrator with adjustable controls.

To write, a pulse is applied to coil transducer 32 to start a stress wave down the line. At a measurable time thereafter, an electric pulse is applied to conductor 31. At time T, after the pulse of generator 34, the stress wave has arrived at a predetermined position along the line. At this position, the permeability of the tube is locally increased and at this instant in time the circumferential magnetic field produced by the electrical conductor 31 will locally magnetize the tube 30. The position of the locally magnetized mark is determined by the duration of the delay of the electrical pulse after the start of the magneto-acoustic pulse.

To read out the recorded information, switch 36 is operated to connect conductor 31 to the input of the read gate 35. A magneto-acoustic pulse from generator 34 is propagated down the line. When this magneto-acoustic pulse arrives at the position on the line which has been locally magnetized, a voltage is induced in line 31. If, now, read gate 35 has been enabled by the properly adjusted delay 33, the induced electric pulse on line 31 is read out at output terminal 37.

For a given velocity of propagation, the length of the recording pulses largely determines the number of bits per inch which can be stored on the line. The entire information content stored on the line may be serially read out by opening gate 35 for the duration of the acoustic pulse travel time, or may be selectively read out by address information supplied by the variable delay device to the gate 35.

The operation of the storage device of FIG. 2 may be explained with the aid of the characteristic curves of FIG. 3. With stress, S, applied locally to the magnetostrictive tube 30, induction for a given applied field $H_1$ is much greater than when the stress S is absent. The application of a field $H_1$ when stress S equals zero will produce a residual induction $B_1$ which is zero or near-zero. However, when a stress pulse is applied simultaneously with field $H_1$, the induction is increased so that a residual induction of $B_2$ exists when $H_1$ is removed. It has been found that this residual induction settles to value $B_3$ after both H and S are removed. But the value of $B_3$ is substantial and is easily measured. When a read-out magneto-acoustic wave is applied to the line, the region of the line in the $B_3$ state increases in induction to approximately $B_2$. This change of induction is utilized to indicate that a bit of information has been stored. Conversely, the magneto-acoustic wave applied to the line in the $B_1$ state will produce negligible change in induction.

Analog signals as well as digital or binary signals may be read into and out of the storage line of this invention.

In FIG. 2 is shown the analog signal source 38 which serves to amplitude modulate in attenuator modulator 39 the pulses from source 34. The repetition rate of the pulses of source 34 should preferably be outside the frequency range of the analog signal. If voice frequencies are involved, the repetition rate of source 34 might be 20 kilocycles per second, for example. The delay due to the variable delay device 33 is varied by means of a sweep generator 39b from a minimum to a maximum time delay, as determined by the length of line 30 and by the velocity of propagation. To start the sweep when the analog signal starts, switch **39*a* may be used where double contacts close simultaneously to simultaneously start modulation of the pulse train and sweep of the variable delay. Switch 39*c* is operated as indicated to shunt the pulses through the modulator. During read-out of a message recorded on line 30**, the read-out gate would remain closed.

The three properties of the storage line, namely, magnetostriction, electrical conductivity and low coercive force may be incorporated in a single coherent body. It has been found that a single wire, **30*a*** in FIG. 2*a*, of any one of several magnetostrictive metals and alloys serve the purposes of this invention. A wire of nickel or permalloy, for example, is tautened lightly between supports and is connected at its ends to the pulse source 34, as in FIG. 2. The pulse source also is connected to the coil 32, as in FIG. 2. In operation, the magneto-acoustic stress wave is propagated down the wire **30*a* and at a measurable time thereafter, determined by the variable delay device 33**, an electrical pulse is applied to the wire. At the point where the stress wave may have arrived and at which point the permeability is increased, the circumferential field produced by the electrical pulse will locally magnetize the wire.

Alternative to momentarily applying magnetic field throughout the length of the line from conductor 31, as shown in FIG. 2 or 2*a*, the magnetic field may be supplied from a permanent magnetic element disposed along the length of the line, as shown in FIG. 4.

In the particular embodiment of FIG. 4, the storage line 30 is fabricated from three materials chosen for the three desirable properties. The line is an elongated laminate comprising a ribbon-like conductor 40 selected for its relatively high magnetostrictive sensitivity. Applied to one side of strip 40 is the strip 41 selected for its high energy product and high coercive force characteristics. Strip 41, in this embodiment, is permanently magnetized, to establish throughout the length of the line a steady permanent field. Strip 42, on the other hand, is applied to the opposite face of strip 40 and is chosen for its characteristic of low coercive force and good magnetic retentivity. Here, the metal strip 40 of the line is a shield and functions as a gate between the permanent magnet 41 and the storage medium 42. The magnetostrictive strip 40 may be any of many ferromagnetic materials including nickel, iron, and cobalt and various alloys of these metals found to have high magnetostrictive sensitivity. Conveniently, permanent magnet element 41 may comprise finely divided magnetic oxides prepared in a slurry and painted on one face of the ribbon 40, much in the manner of commercially available coatings customarily applied to ordinary flexible recording tapes. The coating may then be magnetized by passing the strip through a suitable magnetizing field. Direction of polarization is preferably vertically in FIG. 4, although horizontal polarization also is contemplated. Horizontal polarization is referred to below in connection with FIG. 5. Strip 42, on the opposite face, may likewise comprise a coating of finely ground magnetic oxide particles, similar to coating 41, applied in the usual way to the base by electrochemical or vacuum deposition or magnetic plating. As stated, however, strip 42 is prepared so as to exhibit a low coersive force characteristic so that the strip can be magnetized and can retain in any localized area that magnetization. The thickness of the coatings 41 and 42 are grossly exaggerated to better illustrate the invention.

In the particular embodiment of FIG. 4, at each end of the line is provided a transducer for applying to the line magneto-acoustic pulses. As shown, the transducers are coils 43 and 44. Each end of the line is preferably supported in a lossy material for preventing reflections. The pulse generator 34 applies pulses 45 to each coil. The current of the pulse and the number of turns of the coils are sufficient to shock the magnetostrictive strip 40 with a momentary magnetic field sufficiently strong to start a stress wave down the line. If distance *d* between coils corresponds to travel time, T, of a stress wave between the coils, two stress waves from coils 43 and 44, started simultaneously, will meet at the center of the line at the time $T/2$. The meeting point, however, can be adjusted to any location along the line between the two coils by adjusting the relative starting times of the two stress waves. Conveniently, starting time can be controlled by pulse delay devices 46 and 47, respectively, in series with coils 44 and 43. In the example assumed, the delay of device 46 provides a fixed delay of T, while the delay of device 47 is adjustable from zero to 2T. Such a selection of delays permits the operator to address the meeting and coincidence of the two pulses to any point along the line.

Let it be assumed that the B–H characteristic of the storage strip 42, FIG. 4, is similar to that shown in FIG. 4*a*. In FIG. 4, two simultaneous fields $H_1$ and $H_2$ are necessary to saturate and permanently magnetize strip 42. Further, let it be assumed that $H_1$ and $H_2$ correspond with the magnetic fields that are gated through strip 40 from strip 41 to strip 42 in response, respectively, to the magneto-acoustic waves from transducers 43 and 44. When the two fields coincide in time, the magnetic induction of strip 40 rises to some relatively high value corresponding to induction $B_2$. But, either field $H_1$ or $H_2$ alone is insufficient to produce induction $B_2$. At the moment of coincidence of the two fields, the permeability of the strip 40 will be increased sufficiently to permit the permanent magnet 41 to "see" through the strip 40 and to locally magnetize storage medium 42. That is, only at the meeting point of the traveling acoustic waves is there sufficient field of the permanently magnetized strip 41 gated through to strip 42 to permanently magnetize a localized area or spot on strip 42. As stated, the location or address of the stored bits is controlled by adjustment of the delay device 47.

To read out the information stored on strip 42, FIG. 4, a magneto-acoustic wave is propagated down the line from one of the coils 43 or 44. When this wave passes the magnetized spot, having inducation $B_2$, FIG. 4*a*, a voltage is inducted to the conductor 40, just as in FIG. 2. The voltage induced in the conductor 40 is read out through conductor 48, switch 49, and amplifier 50. The output terminal 51 of amplifier 50 may be connected to any desired utilization circuit. All stored bits on the line can be serially read out, or, if desired, can be selectively read out by timed gating circuits, as in FIG. 2.

Information stored on the line may be erased by any one of several techniques. One convenient method comprises applying a damped electric oscillation to the line from oscillator 52, FIG. 4. The amplitude of the damped oscillations **52*a* are sufficient to demagnetize the entire strip 42**.

Various arrangements of the laminae 40, 41 and 42 are contemplated. As shown in FIG. 5, both layers 41 and 42 may be applied to one side of the magnetostrictive strip 40. More or less of the magnetic lines of force, horizontally polarized as suggested at A, couple the permanent magnet 41 with the storage medium 42 depending upon the permeability of the magnetostrictive strip 40. In FIG. 5, read-in magneto-acoustic information is effectively gated into the storage medium by coincidence of the two time controlled events.

While coil transducers have been shown in FIGS. 2, 4 and 5 for starting the magneto-acoustic wave, other transducers may be employed. The stress wave may be initiated by any device for mechanically shocking the storage line. A piezoelectric quartz crystal is admirably adapted to perform this function. Considerable mechanical motion can be efficiently produced on the Y-axis of a crystal by applying a voltage across the X-axis. This motion can be transmitted to the end of the magnetostrictive strip 40 in FIG. 6 by establishing a good mechanical bond between the end of the strip and the appropriate face of the rectangular quartz crystal 60. The two terminals 61 and 62 of the crystal are connected to the pulse source 34. The stress waves initiated by the crystal are propagated down the line, and the location of the changing permeability is employed to store information in the line, as explained above.

In FIG. 7 is shown another specific embodiment of a piezoelectric transducer. The piezoelectric transducer 70 comprises a disc-shaped crystal of quartz, barium titanite, $BaTiO_3$, Rochelle salts or ceramics, as described in the textbook entitled "Physical Acoustics and Properties of Solids," written by W. P. Mason, and published by Van Nostrand in 1958. For stimulating the crystal, metallic discs 71 and 72 are formed as by cathodic deposition on opposite ends of the crystal body. To one end of the crystal is attached a conical acoustic transformer 73. The cone is attached at its large end to the transducer and at its small end to the line 30. As explained in the Mason text, supra, motion of the large end of the transformer is amplified at the small end to increase the amplitude of the stress wave in the connected line 30. The line 30 in this embodiment preferably comprises an iron-nickel-titanium alloy or an iron-nickel-chromium alloy having the magnetostrictive, permeability, and electrical conductivity characteristics desired. Such alloys are described in detail in the "Proceedings of the Institute of Electrical Engineers" for 1956, vol. 103B, page 497. Alternatively, and as shown in FIG. 7, in the interest of low acoustic losses, quartz fibers may be employed for the core of the line, and a thin magnetostrictive film, such as powdered 60% nickel iron, plated or vacuum deposited on the core. Alternatively, to approximate the structure of FIG. 5, layers of high coercive force material and low coercive force material are applied to the magnetostrictive layer. To prevent shunting of the magnetic circuits as between the magnetostrictive film and a metal core, it has been found desirable to separate the film from the core with an insulating layer such as silicon oxide. The pulse generator 34 is connected across the terminals of the piezoelectric transducer and is connected through variable delay device 47 and switch 36 to the line. Read-in is performed as described and read-out is through gate 35, as above.

What is claimed is:

1. Information storage apparatus comprising:

(a) a medium having storage locations for information, (b) a transducer connected to said medium and operable to change dimensions only in a first propagating direction along said medium for applying a mechanical signal which includes substantially no torsional components in said first propagating direction along said medium for changing the information storage property thereof, and (c) signal responsive means including a conductive element extending along said medium in said first propagating direction for applying a field, which substantially excludes axial and any other components in said first propagating direction, in a second direction transverse or circumferential to said first propagating direction and in time coincidence with said mechanical signal, thereby to store information in said medium.

2. The invention as set forth in claim 1 wherein said medium is in the form of a line.

3. The invention as set forth in claim 2 wherein said line is a tube.

4. The invention as set forth in claim 2 wherein said line is a wire.

5. The invention as set forth in claim 1 wherein said medium is comprised of a retentive magnetic material.

6. The invention as set forth in claim 3 wherein said tube is comprised of retentive magnetic material.

7. The invention as set forth in claim 4 wherein said wire is composed of retentive, magnetizable magnetostrictive material which is electrically conductive and wherein said field applying means includes a source of electrical signals operatively connected to said wire.

8. The invention as set forth in claim 5 wherein said material is an alloy, including approximately 60% (sixty percent) nickel and the rest iron.

9. The invention as set forth in claim 5 wherein said material is an alloy of nickel, iron and cobalt, having magnetostrictive properties.

10. The invention as set forth in claim 5 wherein said material is an alloy of nickel, iron and titanium, having magnetostrictive properties.

11. The invention as set forth in claim 5 wherein said material is an alloy of iron, nickel and chromium, having magnetostrictive properties.

12. The invention as set forth in claim 1 wherein said mechanical signal applying means and said field applying means each include separate electrical signal controlled operating means for applying electrical operating signals thereto, and wherein at least one of said operating means includes means for modulating said electrical operating signals.

13. The invention as set forth in claim 1 wherein said means for applying said field includes means for controlling the intensity of said field, whereby to store different information in terms of different field intensity.

14. The invention as set forth in claim 2 wherein said mechanical signal applying means includes an electromechanical transducer operable by a first electrical signal for propagating said mechanical signal longitudinally along said line, and wherein said field applying means includes a wire effectively parallel to said line and operated by a second electrical signal.

15. The invention as set forth in claim 15 including means for timing the occurrence of said second electrical signal with respect to the time of occurrence of said first electrical signal.

16. The invention as set forth in claim 14 wherein said timing means includes a pulse source coupled to said electromechanical transducer and variable delay means input coupled to said pulse source and output coupled to said element.

17. The invention as set forth in claim 16 including a sweep generator for cyclically changing the delay period of said delay means in accordance with the information to be stored, and an attenuator modulator connected between the output of said delay means and said element also controlled by the information to be stored.

18. The invention as set forth in claim 1 wherein:
- (a) said medium is an elongated element of retentive magnetic material,
- (b) said signal responsive means includes:
  - (i) means for establishing an elementary magnetic circuit in a plane transverse to the long dimension of said element, said circuit including (1) a first portion having a variable reluctance (2) a second portion provided by said element and having a relatively small area hysteresis curve, low coercive force and relatively high magnetic retentivity as compared to said first portion, and (3) a third portion having permanent magnetization, and
  - (ii) means for momentarily changing the reluctance of said first portion to controllably magnetically couple said third portion to said second portion to magnetize said second portion, and
- (c) wherein said mechanical signal applying means includes means for propagating said elementary magnetic circuit longitudinally along said element.

19. Information storage apparatus comprising:
- (a) a first strip of magnetic material having different degrees of permeability respectively in the absence and presence of mechanical stress applied thereto,
- (b) a second strip of permanently magnetized material,
- (c) a third strip of permanently magnetizable material,
- (d) said strips being disposed in side by side relationship to define a laminar structure, and
- (e) means for passing alternating current through said first strip.

20. The invention as set forth in claim 19 wherein said first strip is a conductor having magnetostrictive characteristics.

21. The invention as set forth in claim 20 including a plurality of signal operated transducers coupled to said structure for stressing said first strip, said transducers being spaced from each other along said structure, and means for variably delaying the operating signal applied to at least one of said transducers.

22. A system for storing information comprising:
- (a) a line of retentive material having a retentivity which is a function of mechanical stress applied thereto, and which is initially de-polarized or erased,
- (b) a transducer operable to change dimensions only in a direction axially along said line and coupled to said line for propagating stress impulse excluding torsional components along said line,
- (c) electrical signal operated means including a conductive element extending only in a direction parallel to said line for providing a field in a second direction transverse or circumferential to said propagating stress pulses and which field substantially excludes axial components to which said line is disposed,
- (d) means for applying said electrical signals to said transducer,
- (e) means for applying said signals to said field providing means in timed relationship with the application of said signals to said transducer thereby to store information in successive increments along said line, and
- (f) means for controlling the intensity of said field and said stress impulses for the varying of the stored information.

23. The invention as set forth in claim 22 wherein said line is comprised of magnetostrictive magnetic material and wherein said field providing means is operative to provide a magnetic field.

24. The invention as set forth in claim 22 including a source of pulses which provide said signals wherein said field applying means includes a variable delay element coupled to said source and a line element for establishing said field, and wherein said field intensity controlling means includes a variable attenuator connected between said delay element and said line element.

25. The invention as set forth in claim 24 including an AND gate connectable to said line element and to said delay element when said system is conditioned to read out the information stored on said line.

26. Information storage apparatus as set forth in claim 1 comprising:
- (a) a medium having storage for information,
- (b) means for applying a mechanical signal in a first direction to said medium for changing the information storage property thereof,
- (c) signal responsive means for applying a field exclusively in a second direction transverse to said first direction and in time coincidence with said mechanical signal, thereby to store information in said medium, and (d) wherein said medium includes an elongated acoustically transmissive element in the form of a wire having on a surface thereof a thin film of material having storage for information.

27. The invention as set forth in claim 26 wherein said element is comprised of a di-electric material.

References Cited

UNITED STATES PATENTS

| | | | |
|---|---|---|---|
| 3,069,661 | 12/1962 | Gianoca | 340—174 |
| 3,320,596 | 5/1967 | Smith | 340—174 |

OTHER REFERENCES

Ferromagnetism: by Bozorth, D. Van Norstrand Co., New York, sixth printing, 1951. QC 753, B69 C60, pp. 674–676, 680 and 682–684.

TERRELL W. FEARS, Primary Examiner

U.S. Cl. X.R.

333—30; 340—173